UNITED STATES PATENT OFFICE.

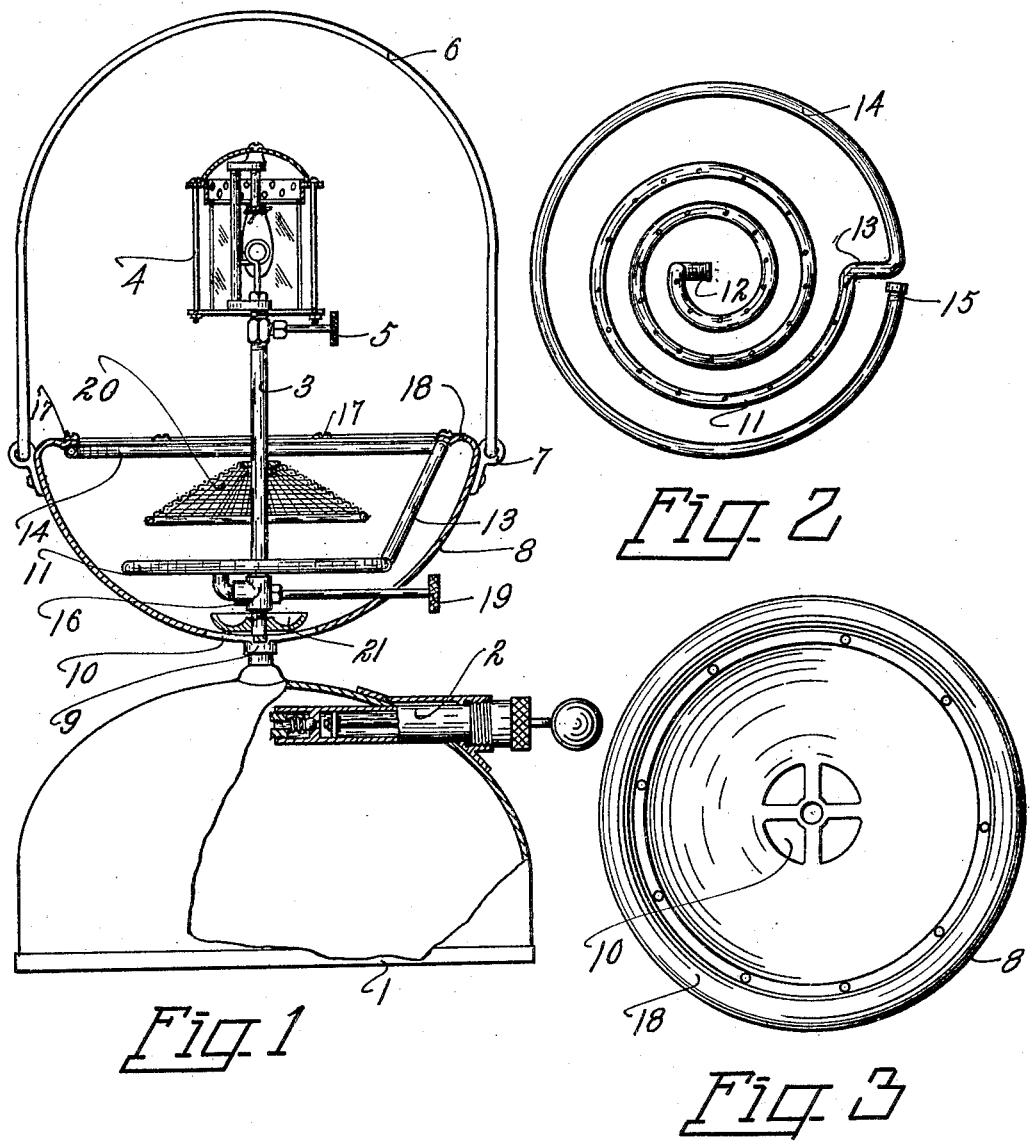

WILLIAM F. LACKIE, OF OPPORTUNITY, WASHINGTON.

INSECT-EXTERMINATOR.

1,397,218.   Specification of Letters Patent.   Patented Nov. 15, 1921.

Application filed February 26, 1921. Serial No. 447,955.

*To all whom it may concern:*

Be it known that I, WILLIAM F. LACKIE, a citizen of the United States, residing at Opportunity, in Spokane county and State of Washington, have invented certain new and useful Improvements in Insect-Exterminators, of which the following is a specification.

My present invention relates to improvements in insect exterminators of the illuminated type designed as a protection against the depredations of moths and other insects that are destructive to the life of fruit bearing trees, as for instance those of apple orchards, and adapted for use at night.

Among orchardists it is well known that the periodical spraying of trees, at expensive cost, is not entirely effective in preventing heavy losses from ruined crops by attacks from insects, and the purpose of my invention is the provision of an effective exterminator, of which say four are to be used to each acre of orchard, for attracting and effectively disposing of the insects that fly at night, and thus preserve the crop of fruit.

To this end the invention consists essentially in an illuminated exterminator possessing a heating element in combination with the lamp or light whereby the insects or moths are attracted and destroyed, and in certain novel combinations and arrangements of parts, as will be hereinafter explained.

In the accompanying drawings I have illustrated one complete example of the physical embodiment of my invention utilizing a gasolene torch and incinerator, in which the parts are combined and arranged according to the best mode I have thus far devised for the practical application of the principles of my invention, but it will be understood that changes and modifications may be made therein without departing from the scope of my invention. For instance, in place of the hydro-carbon used for fuel and illuminant, I may substitute an electric illuminating device and a similar heating element in combination with the illustrated structure of the invention. These and other colorable changes may be made within the scope of my appended claims.

Figure 1 is a view in elevation and partly in section, of an exterminator embodying one form of my invention.

Fig. 2 is a plan view of the burner coil, detached.

Fig. 3 is a plan view of the hemi-spherical bowl and reflector forming part of my device.

In the preferred form of the invention as illustrated in my drawings I have shown a gasolene tank 1 for fuel supply, equipped with a well known type of air pump 2 for adding pressure to the interior of the tank in order to maintain the fuel supply in the supply pipe 3 which rises from the top center of the rounded tank. At the upper end of the fuel pipe 3 is attached the torch or lamp 4 controlled by the valve 5 in the usual manner, and adapted for use in attracting insects to the exterminator, at night. The device is portable and may be carried by hand, using the bail 6, which is connected at 7 to the bowl 8 of the exterminator, and the bowl is supported at 9 on the fuel supply pipe as shown in Fig. 1. The bowl is preferably of metal, and its interior hemispherical surface is polished and adapted to form a heat reflector as well as a receptacle for the trapped insects, openings 10 being provided at the lower central portion of the bowl for disposition of the trapped insects. The insects are exterminated by heat from the burner 11, which as shown in Fig. 2 is a coiled pipe, perforated on its upper surface for exit of gases of combustion under pressure from the supply tank, and located within the bowl in such position that the hot gases of combustion therefrom may heat the interior of the bowl and be reflected therefrom with sufficient intensity as to consume or incinerate the insects attracted to the lamp 4. At its inner end 12 the coil is attached or connected to the supply pipe, and at its outer end the coil is fashioned with a radially projected and upwardly extending arm 13 which terminates in a circular pipe 14 having its end closed at 15. This circular pipe has orifices or openings on its under face for jets of flame, and as it is elevated on a higher plane than the coil 11, is adapted to be secured by screws 17 beneath the edge of the inturned annular flange 18 at the top of the bowl. Thus the fuel supply for both the coil and annular pipe is controlled by the valve 19, joining the coil and supply pipe, and in addition to the main burner 11, the annular pipe or burner 14 provides a heated barrier against egress of insects that may have been only partially disabled, and which may attempt to escape by crawling up the interior walls of the bowl. Above the main burner a foraminous shield 20, in the form of a conical wire screen, is supported on the fuel supply pipe as a post, to prevent the burned insects falling on the burner and clogging the flame orifices thereof, and it will be apparent that the incinerated insects, falling on the shield, will be directed toward the interior bottom of the bowl and fall through the outlet openings 10 provided therefor.

A priming cup 21 is also provided for initial use in aiding vaporization of the gasolene or liquid fuel when lighting the burner and lamp, and it will be apparent that the liquid fuel, under pressure from the air pump 2, is passed up through the fuel pipe to the coil and annular pipe for heating, and to the lamp for illumination. The device may rest upon the ground, or be suspended, as from a tree or post, by the bail 6, and as before stated, four of the devices may be effectively used to each acre of orchard.

The insects are of course attracted by the illumination of the lamp, and when arriving in close proximity thereto and over the burners, are destroyed by the intense heat from the burners, and disposed of as described.

From the above description taken in connection with my drawings it is apparent that I have provided a device of this character that fulfils the objects set forth as the purpose of my invention, and provides a comparatively perfect instrumentality for performing its required functions.

Having thus fully described my invention, what I claim as new and desire to secure by Letters Patent is—

1. The combination with a supply tank, fuel pipe and lamp thereon, of a bowl having a reflecting surface and exit openings, a main burner within the bowl, said bowl having an inturned annular flange, an auxiliary burner attached to said flange, and a foraminous shield on said pipe over the main burner.

2. The combination with a base and central post and a lamp on the post, of a bowl having a reflecting inner surface and exit openings, a heating element within the bowl, an inturned annular flange on the bowl, an auxiliary heating element on said flange, and a foraminous shield supported on said pipe over the main burner.

3. The combination with a supply tank, fuel pipe and lamp thereon, of a bowl having bottom openings and an inturned upper flange, a coil located in the bottom of the bowl and forming a main heating element therein, and an extension of said coil on an elevated plane, attached to said flange and forming an auxiliary burner, for the purpose described.

4. The combination with a gasolene supply tank and means for supplying air under pressure thereto, of an upright, central fuel pipe and a lamp thereon, a bowl beneath said lamp having bottom openings and an upper, inturned, annular flange, a perforated coil attached to said pipe and located near the bottom of the bowl, a foraminous shield supported on said pipe above the coil, a radial extension from said coil, and an annular perforated pipe connected with said extension and attached to said flange, for the purpose described.

In testimony whereof I affix my signature.

WILLIAM F. LACKIE.